United States Patent
Mangum et al.

[11] Patent Number: 5,857,144
[45] Date of Patent: Jan. 5, 1999

[54] IN-BAND VEHICULAR REPEATER FOR TRUNKED RADIO SYSTEM

[75] Inventors: Peter M. Mangum, Forest; Clyde R. Butler, Jr., Madison Heights; Steven T. Dreon, Forest; Laurence A. La Fratta, Lynchburg; Mark D. Priest; Gary J. Pitcher, both of Rustburg, all of Va.

[73] Assignee: Ericsson, Inc., Research Triangle Park, N.C.

[21] Appl. No.: 694,745

[22] Filed: Aug. 9, 1996

[51] Int. Cl.⁶ .................................................. H04B 7/15
[52] U.S. Cl. ............................................................. 455/11.1
[58] Field of Search ................................ 455/11.1, 509, 455/512, 517, 518, 524, 525

[56] References Cited

U.S. PATENT DOCUMENTS

| | | | |
|---|---|---|---|
| 3,955,140 | 5/1976 | Stephens et al. | 455/11.1 |
| 4,056,779 | 11/1977 | Toler | 455/11.1 |
| 4,056,780 | 11/1977 | Faulkner | 455/11.1 |
| 4,150,334 | 4/1979 | Williams | 455/17 |
| 4,383,332 | 5/1983 | Glance et al. | 455/562 |
| 4,539,706 | 9/1985 | Mears et al. | 455/11.1 |
| 4,553,262 | 11/1985 | Coe | 455/509 |
| 4,553,272 | 11/1985 | Mears | 623/1 |
| 4,659,878 | 4/1987 | Dinkins | 455/11.1 |
| 4,771,448 | 9/1988 | Koohgoli et al. | 455/450 |
| 4,905,302 | 2/1990 | Childress et al. | 455/515 |
| 4,939,746 | 7/1990 | Childress | 455/509 |
| 4,965,787 | 10/1990 | Almond et al. | 370/466 |
| 5,010,583 | 4/1991 | Parken | 455/9 |
| 5,056,152 | 10/1991 | Truby et al. | 455/11.1 |
| 5,109,526 | 4/1992 | Reed | 455/436 |
| 5,175,866 | 12/1992 | Childress et al. | 455/8 |
| 5,276,686 | 1/1994 | Ito | 370/330 |
| 5,355,511 | 10/1994 | Hatano | 455/11.1 |
| 5,408,680 | 4/1995 | Hattey | 455/508 |
| 5,425,030 | 6/1995 | Comroe et al. | 370/336 |
| 5,428,817 | 6/1995 | Yahagi | 455/446 |
| 5,430,789 | 7/1995 | Ohgami | 455/561 |
| 5,487,185 | 1/1996 | Halonen | 455/561 |
| 5,490,284 | 2/1996 | Itoh | 455/11.1 |
| 5,519,761 | 5/1996 | Gilhousen | 455/431 |
| 5,533,029 | 7/1996 | Gardner | 370/329 |
| 5,548,809 | 8/1996 | Lemson | 455/454 |
| 5,666,661 | 9/1997 | Grube | 455/509 |

FOREIGN PATENT DOCUMENTS

| | | |
|---|---|---|
| 35 28 886 A1 | 2/1987 | Germany . |
| 2 298 998 | 9/1996 | United Kingdom . |

*Primary Examiner*—Howard Britton
*Attorney, Agent, or Firm*—Burns, Doane, Swecker & Mathis, LLP

[57] ABSTRACT

A vehicular repeater system communicates with a portable mobile radio using the same RF communication band and digital trunking protocol that it communicates with a base site. The repeater station may employ an operational radio within a vehicle which communicates with the base site. A separate repeater radio module is connected to the operational radio, preferably through hardwired links. The separate repeater radio module includes a transmitting section which receives messages from the base site through the operational radio, and forwards these messages through a passive RF interface to a portable radio. The separate repeater also includes a receiving section which receives messages from the portable radio, and forwards these messages through the operational radio to the base site. Additionally, the receiver section may include a padded receiving section with low power amplification and additional receiver attenuation for monitoring other nearby vehicular repeater systems for potential interference prior to allowing its own vehicular repeater to become active.

22 Claims, 7 Drawing Sheets

IN-BAND VEHICULAR REPEATER FOR TRUNKED RADIO SYSTEM

BACKGROUND

The present invention relates generally to trunked radio communication systems employing vehicular repeaters.

Municipal agencies commonly employ public service trunked (PST) radio services to provide communication between various individuals within a metropolitan area, such as the employees of a city's fire and police departments. Private entrepreneurs may also provide trunked radio systems at one or more sites within a given geographical area for use by one or more independent business entities using special mobile radios (SMR). Typically, the users within these systems share a prescribed number of frequency channels. Access to the channels is coordinated by a central trunking processor.

In recent years, trunked radio communication systems have employed digital data protocols (including the use of digital control channels) to provide a number of special features. For instance, the use of a digital data protocol enables a central dispatcher to selectively transmit a message to an individual's mobile radio. The dispatcher may also transmit a message to a predefined group of mobile radios, such that each member within the group simultaneously receives the message. For instance, a typical PST system might allocate groups (or fleets) corresponding to squad car patrolmen, foot patrolmen, narcotics officers, etc. A discussion of various special features typically provided in trunked radio communication systems may be found in commonly assigned U.S. Pat. No. 4,905,302 to Childress et al., which is incorporated herein in its entirety.

In such systems it is generally desirable to provide "balanced" mobile radio coverage. A system is "balanced" when each mobile radio that receives messages from a given base site may, in turn, successfully transmit messages to the base site. This goal may be achieved to some extent by appropriately adjusting the location and output power of the base site equipment, as well as the output power of the mobile radios.

However, in many applications it is necessary to communicate between a base site and one or more hand-held portable radios. For instance, foot patrolmen typically carry small portable radios to communicate with a central base site. Also, squad car officers typically carry similar portable radios when leaving their vehicles to investigate an accident, complaint or disturbance. Because of size constraints, these smaller mobile radio units often do not have sufficient power to reach a central base site, thereby preventing balanced coverage.

System designers have addressed this problem through the use of repeaters. In operation, the low power portable stations transmit their messages to a repeater station, where they are forwarded to the base site, typically at a higher power level. The repeater station may be mobile. For instance, the messages transmitted by a police officer's portable radio might be transmitted to a repeater housed in the officer's squad car, and then forward to the base site. Commonly assigned U.S. Pat. No. 4,150,334 to Williams exemplifies this technique.

Typically, vehicular repeaters employed a first band of frequencies when communicating with the portable radios, and a second separate band of frequencies when communicating with the base site equipment. When the vehicular repeater received a message from a portable radio, it converted the message to the band of frequencies compatible with the base site equipment. This technique is exemplified in U.S. Pat. No. 4,553,262 to Coe, assigned to Motorola, Inc. In this manner, the system designer could be assured that the vehicular repeaters would not interfere with the operation of the base site equipment.

Although conceptually simple, this solution suffers many drawbacks. Notably, the portable radio was limited to use with the repeater. Even if the portable station had sufficient power to successfully transmit a message to the base site equipment, it could not do so, as the base site equipment operated using a different communication band.

Furthermore, these portable radios and their associated repeaters were typically configured to communicate with each other on a single frequency in a non-trunked (or "conventional") manner separate from the digital protocol employed by the base station and associated trunked mobile receivers. Because of these limitations, various special services provided by the digital trunking system did not extend to the portable radios. These services include, but are not limited to, digital identification of individual and groups of mobiles, emergency and/or priority channel access, wide area "multi-site" interconnections via digital switches, and communication security through voice encryption. In addition to physical signalling limitations, the FCC prohibits trunked operation in certain communication bands commonly used for the "conventional" vehicular repeaters.

Also, because of their single-frequency non-trunked mode of operation, "conventional" radio repeater systems could not accommodate two or more repeaters operating at the same time within close proximity to one another. Otherwise, the two or more repeaters would interfere with each other. For this reason, typical repeater-based radio communication systems assigned one of the repeaters (the "priority repeater") the role of relaying all communication between the portable units and the base station. This had the drawback of overworking the assigned priority repeater and thereby depleting its battery supply. Schemes were devised to shift the role of priority repeater from one repeater to another according to various algorithms. However, these algorithms sometimes delayed communication routed through the repeater.

Finally, available radio spectrum for trunked systems has become a scarce commodity in many areas. Many times, insufficient spectrum exists to allocate a separate band of frequencies to handle communication between the portable radios and the vehicular repeaters.

Accordingly, it is an objective of the invention to provide a vehicular repeater system which does not suffer from the above described drawbacks.

It is a more particular objective of the present invention to provide a vehicular repeater system which makes efficient use of available channels, and which extends the special features provided by a trunked radio systems to portable radios communicating with a base station through a repeater.

SUMMARY

These and other exemplary features are achieved through a radio communication system which uses one or more in-band vehicular repeaters. The repeaters are "in-band" in the sense that the repeaters operate in the same communication band as the base site equipment. In other words, the RF interface of the repeater system is configured to transmit and receive messages with one or more portable radios in the same communication band as the RF interface of the base site equipment. The repeater system is further configured to transmit and receive messages with one or more portable radios using generally the same digitally trunked communication protocol as the base station.

Accordingly, in addition to communication with the vehicular repeater system, the portable radio may directly access the base site equipment if within communication range, thereby expanding the functionality of the portable radios carried by the users.

Furthermore, because the portable radios are more fully integrated into the trunked radio communication system, portable radios may receive various special features provided by the base site equipment. These features include, but are not limited to, digital identification of individual and groups of mobiles, emergency and/or priority channel access, wide area "multi-site" interconnections via digital switches, and communication security through voice encryption.

According to another exemplary aspect, the radio communication system of the present invention can accommodate two or more vehicular repeaters operating simultaneously on different channels in close proximity to each other. This distributes the call traffic to as many vehicular repeaters as possible and hence decreases the rate at which the vehicular repeater batteries are depleted.

According to one exemplary aspect of the present invention, the repeater station may employ an operational radio within a vehicle which communicates with the base site. A separate repeater radio module is connected to the operational radio, preferably through hardwired links. The separate repeater radio module includes a transmitting section which receives messages from the base site through the operational radio, and forwards these messages through a passive RF interface to a portable radio. The separate repeater also includes a receiving section which receives messages from the portable radio, and forwards these messages through the operational radio to the base site. Additionally, the receiver section may include a padded receiving section with low power amplification and additional receiver attenuation for monitoring other nearby vehicular repeater systems for potential interference prior to allowing its own vehicular repeater to become active.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
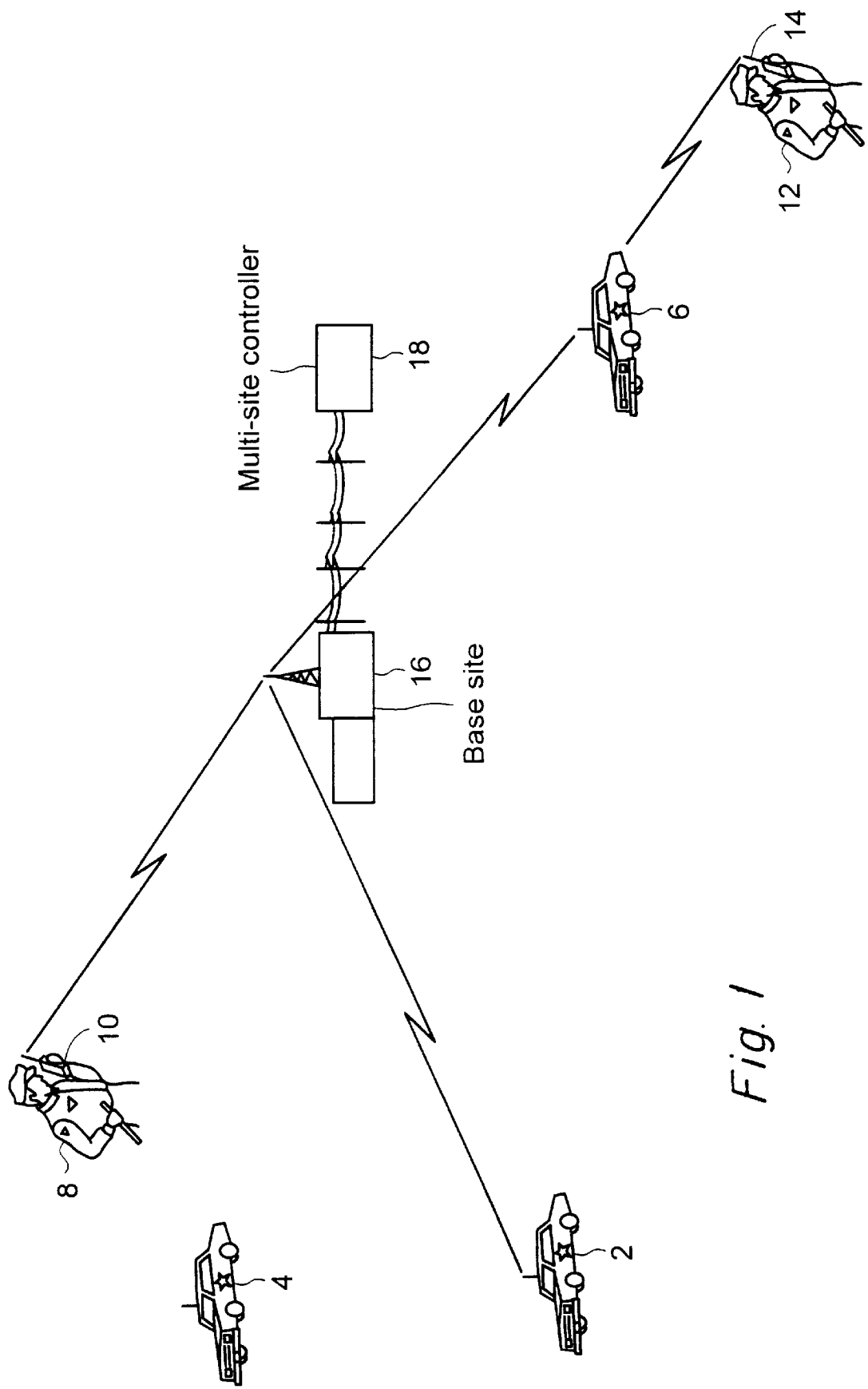
FIG. 1 shows an exemplary trunked radio communication system depicting the use of a vehicular repeater.

FIG. 1 is a schematic diagram of an exemplary embodiment of a trunked radio communication system. As shown there, the system includes base site equipment 16 in telephonic communication with multi-site controller 18. The multi-site controller 18 provides interconnectivity between base site equipment 16 and the site equipment of other sites. Alternatively, the controller 18 may provide connection to one or more dispatch consoles. In fact, the multi-site controller 18 may be dispensed with entirely, and replaced with a dispatch console.

The base station 16, in conjunction with the multi-site controller 18 communicates with one or more mobile stations within a given geographical area. The system depicted in FIG. 1 is shown for simplicity purposes as providing communication services to a police agency. However, it will be apparent that the present invention may be shared with or used by a number of other agencies, such emergency rescue services, water department, fire department, construction/repair departments, etc. Alternatively, the system may be used to provide communication within a private organization using specialized mobile radios (SMR).

As shown in FIG. 1, the radio system provides communications with an officer using a mobile radio located within the officer's squad car 2. The system may also provide direct communication with an officer 8 who leaves his or her squad car 4 via portable radio 10 carried by the officer. However, another officer 12 is located too far away from the base station 16 for his portable radio 14 to successfully transmit a message directly to the base station 16. Hence, the system will transmit the message from the portable radio 14 to a repeater (not shown) located in the officer's squad car 6. The repeater will then relay the message to the base station 16. The exemplary details of the base station 16, multi-site controller 18, and repeater system will be described in the following.

Figure 2:
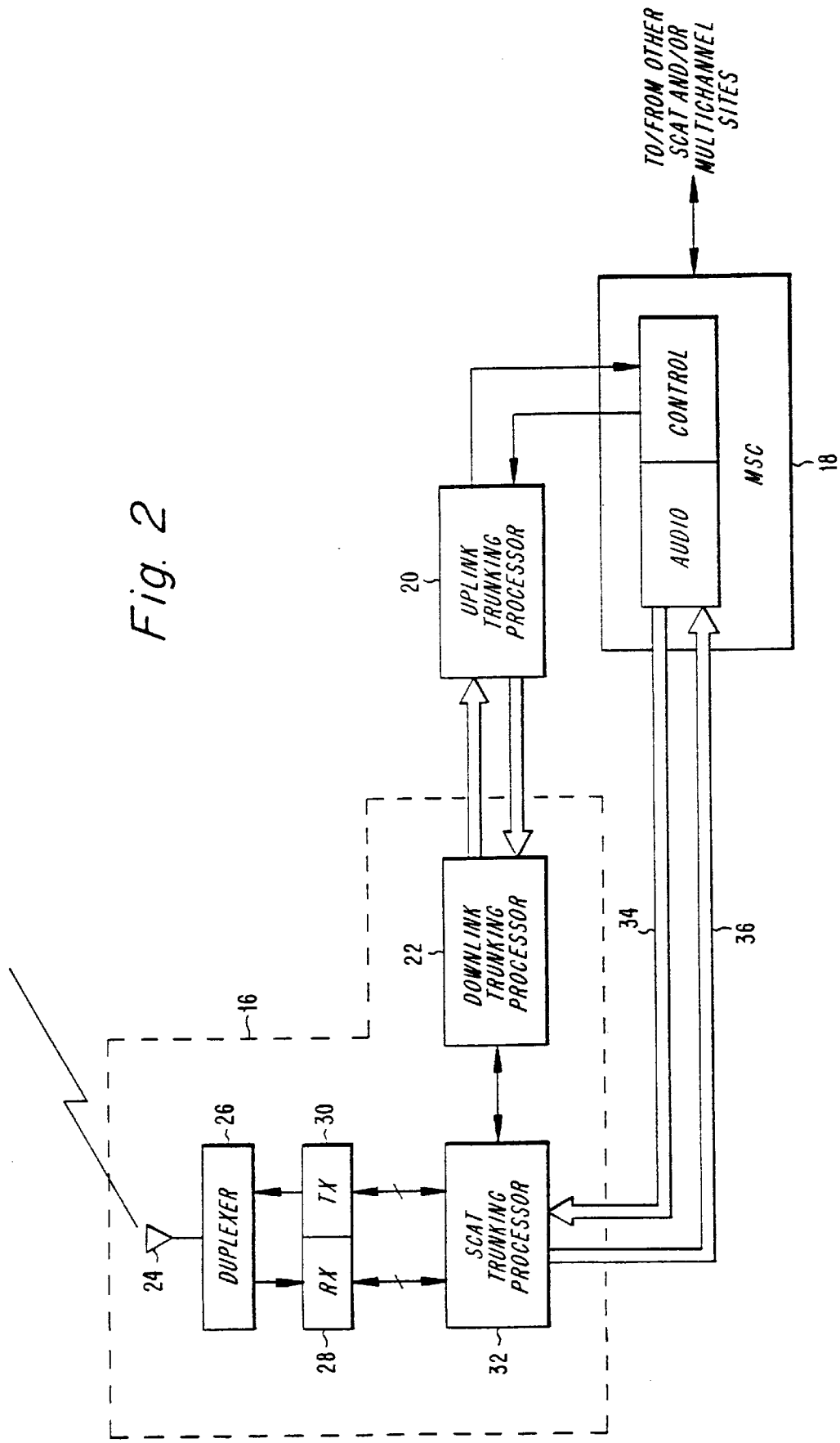
FIG. 2 shows an exemplary base station and master switching center according to the present invention.

FIG. 2 is a schematic diagram of an exemplary base station 16 and multi-site controller 18. As shown there, the system employs the single channel "SCAT" processor 32, as described more fully in commonly assigned U.S. Pat. No. 5,408,680 to Hattey et al., the disclosure of which is incorporated herein in its entirety. By way of summary, in this system, the single channel operates alternatively in a control channel mode and in an assigned channel mode, with the idle mode being the control channel mode. When the system is idle, control channel signalling is transmitted over the single channel. When a channel request is received, a channel assignment message is sent out in a standard manner via the control channel signalling and the single channel then begins operating as an assigned channel. At the conclusion of the assigned channel communication, the single channel reverts to the control channel mode in readiness for further channel assignments. "SCAT" is an acronym for Single Channel Autonomous Trunked system.

While the present invention will be described in the context of single channel mode protocol, it will be apparent that the techniques described and claimed here may be used in other radio system designs and protocols, including multiple channel techniques using dedicated control channels, such as disclosed in commonly assigned U.S. Pat.

No. 4,905,302 to Childress et al., which is incorporated herein in its entirety.

Continuing with the discussion of FIG. 2, the exemplary base station 16 includes an RF antenna 24 and a duplex RF unit including a receiver 28 and a transmitter 30. The receiver 28 and transmitter 30 are controlled by the SCAT trunking processor 32. The SCAT processor 32, in turn, is in communication with multi-site station 18 via audio communication lines 34 and 36. The SCAT processor further receives control information via the downlink trunking processor 22 and the uplink trunking processor 20. In one exemplary embodiment, SCAT trunking processor 32 acts as a "control channel" trunking processor, as described in commonly assigned U.S. Pat. No. 5,175,866 to Childress et al., incorporated herein by reference in its entirety.

Systems according to the present invention may include a single base site 16, or may employ a plurality of base sites (not shown). The multi-site controller 18 may be in communication with one or more dispatch consoles. Alternatively, the system may replace the multi-site controller with a dispatch console.

Figure 3:
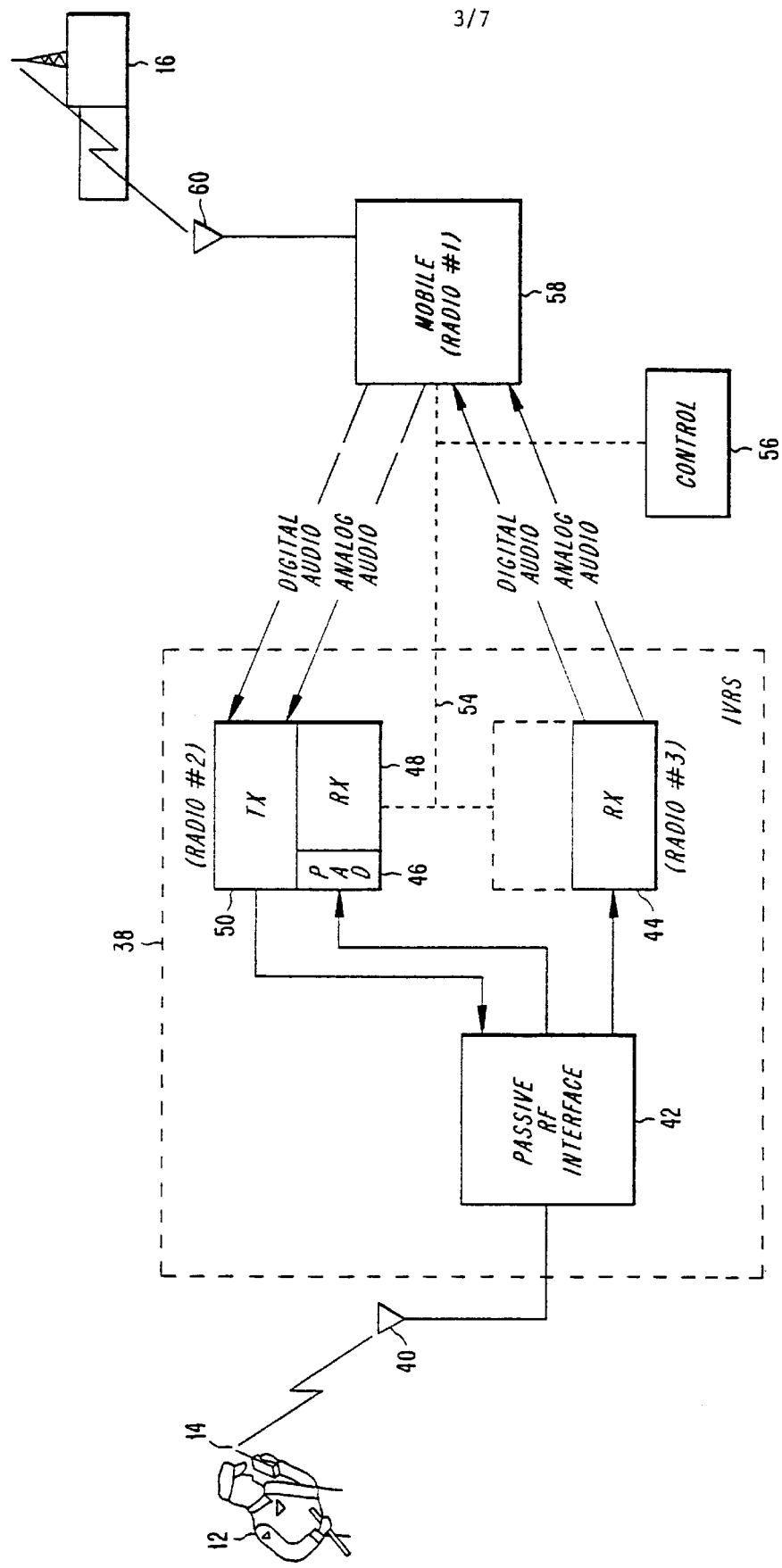
FIG. 3 shows an exemplary vehicular repeater according to a first embodiment of the present invention.
Figure 4:
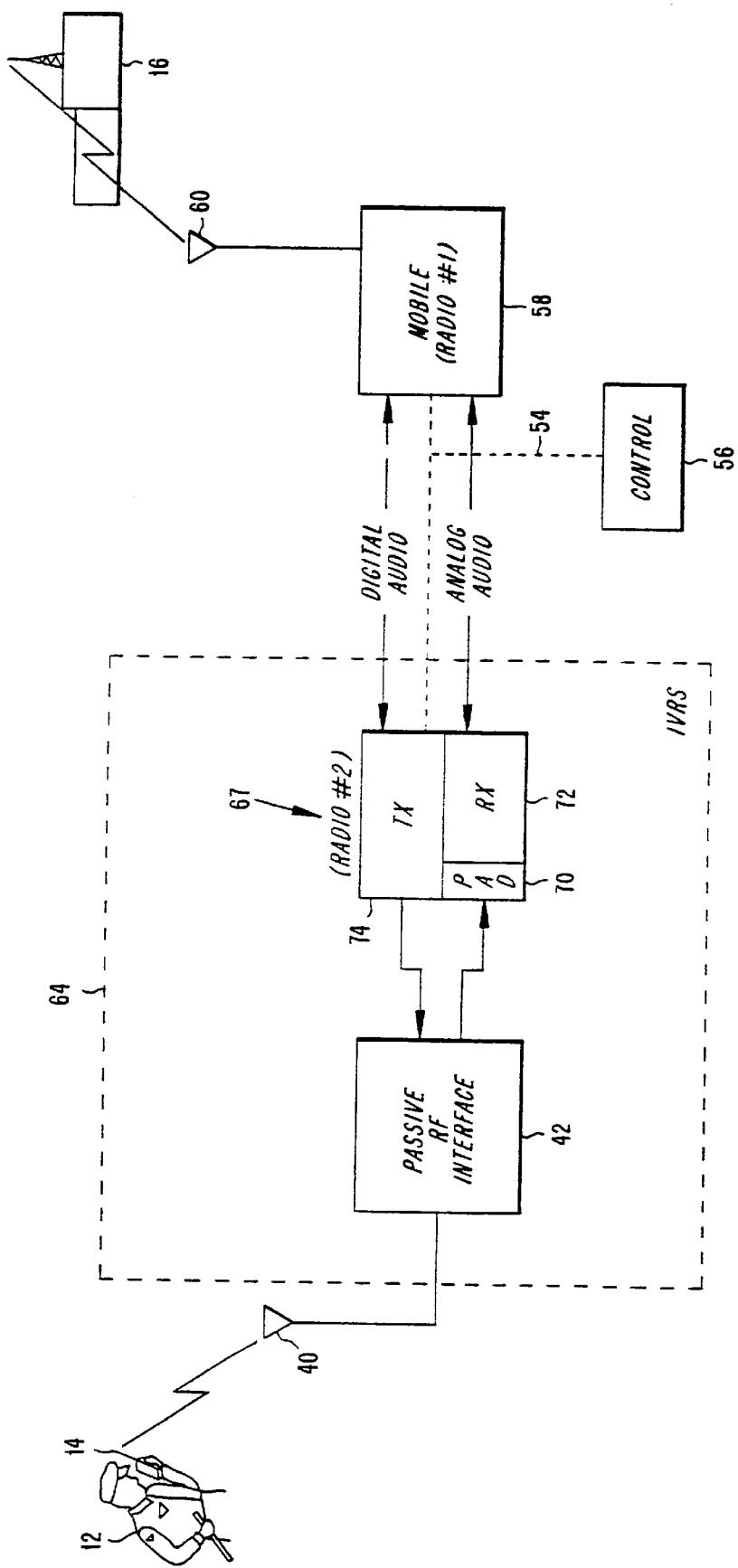
FIG. 4 shows an exemplary vehicular repeater according to a second embodiment of the present invention.

Vehicular repeaters are illustrated in FIGS. 3 and 4, which show, respectively, first and second exemplary embodiments of the repeater. By way of overview, the repeater (38 or 64) forwards a user's 12 message transmitted by portable radio 14 to base site 16. The repeater station employs the same frequency band used by the base site 16. In other words, the repeater system is configured to transmit and receive messages in the same communication band as the base site equipment 16 and using the same digital trunking protocol as the base site equipment 16. Accordingly, in addition to communication with the vehicular repeater system, the portable radio 12 may directly access the base site equipment if within communication range, thereby expanding the functionality of the portable radios carried by the users.

Furthermore, because the portable radios are more fully integrated into the trunked radio communication system, the portable radios may receive various special features provided by the base site equipment. These features include, but are not limited to, digital identification of individual and groups of mobiles, emergency and/or priority channel access, wide area "multi-site" interconnections via digital switches, and communication security through voice encryption.

This type of vehicular repeater system will henceforth be referred to by the acronym IVRS (In-Band Vehicular Repeater System) to facilitate discussion.

FIG. 3 illustrates a first embodiment of the vehicular repeater system. As shown there, the system incudes a first radio 58 (radio #1) which serves as an operational radio located within the vehicle 6. For example, radio 58 can be a squad car radio affixed to the dashboard of a police officer's vehicle used to convey messages to and from the officer while in his vehicle. The vehicle car radio 58 may comprise any standard radio, such as the radios depicted in the various commonly assigned patents which were mentioned above. Radio 58 communicates with base station 16 using antenna 60.

In addition to radio 58, the vehicle 6 also includes two additional radio units according to the present invention, identified herein as radio #2 and radio #3. Both of these radios are connected to a passive RF interface 42 and antenna 40. Antenna 40, in turn, communicates with user 12 via his portable radio 14. Radios #2 and #3 are also connected, preferably by hardwired link, to the vehicle radio 58. The radios #2 and #3 provide both analog and digital audio communication to avoid unnecessary digital to analog and analog to digital conversions of audio speech data when messages are routed through the repeater 38. Additionally, control is provided via a controller 56 in association with an interradio digital communication network, which is denoted by the dotted line 54.

The IVRS unit 38 is preferably manufactured as an integrated "black box" unit which may be installed in the trunk of the vehicle 6. Alternatively, the IVRS unit may be installed in the dashboard of the vehicle. As mentioned, the connection between the IVRS unit 38 and the vehicle radio 58 is preferably via hard wired link.

As shown in FIG. 3, a primary function of radio #2 is to forward information received from base site 16 to portable radio 14. To this end, radio #2 employs a transmitter 50 for transmitting messages received from base site 16 to the portable radio 14 using an operating power balanced for portable operation. A primary function of radio #3 is to receive messages from portable radio 14, which are then forwarded to the squad car radio 58, and then to base station 16. Hence radio #3 is shown as only including a receiving section 44 for receiving across the standard portable mobile radio's (e.g. 14) transmit frequency range.

Radio #2 also includes a receiving section 48 with a low power PA (power amplifier) and additional receiver attenuation incorporated within the section denoted schematically as PAD 46 (e.g. attenuator). The low power PA and receiver attenuation prevent undesired reception of signals emanating from distant radio units. As described in more detail later, when an IVRS unit first comes on-scene or is otherwise activated, the receiver section 48 monitors which frequencies other nearby IVRS units are operating on. To prevent interference, the IVRS unit will not lock onto a control channel which another IVRS unit is already operating on.

FIG. 4 illustrates a second exemplary embodiment of an in-band vehicular repeater system according to the present invention. The system is similar to the first embodiment in its use of an operation vehicle radio 58, which communicates in a typical manner via antenna 60 with base station 16 when the officer 12 is in his vehicle 6. When the officer leaves his vehicle, his portable radio 14 may transmit a message to the antenna 40 and associated passive RF interface 42 of IVRS 64. Control is provided by control unit 56 in conjunction with an interradio digital communication network 54.

However, instead of two radios within the IVRS system, the second embodiment shown schematically in FIG. 4 employs a single radio #2 (67) with duplex capability. Otherwise, the function of radio #2 (67) is similar to the first embodiment. Radio #2 includes a transmitting section 74 which relays information from the mobile radio 58 to the user's portable radio 14. The receiver section consolidates the function of the receiver portions 44 and 46 of the first embodiment shown in FIG. 3. Namely, the receiver 72 includes a primary function of receiving messages from portable radio 14 and relaying the messages to radio base site 16. Additionally, the receiver 72 includes low power PA (power amplifier) circuitry and additional receiver attenuation to prevent inadvertent reception of distant IVRS units, which are collectively denoted by the PAD unit (e.g. attenuator) 70. Through the use of the PAD Unit 70, the receiver 72 monitors other IVRS repeaters in the geographic area before allowing the IVRS 64 to become active to prevent interference as described above.

An exemplary communication protocol used by the radio communication system employing the IVRS units 38 or 64 will now be described in connection with flow charts 5–7. As mentioned, for discussion purposes, the present invention is described as based on the single channel protocol exemplified in commonly assigned U.S. Pat. No. 5,408,680 to Hattey et al. However, it will be apparent to those skilled in the art that the system can be used with other radio communication systems, techniques, and protocols. For instance, the present invention may be used with multiple channel systems by using multiple channel radios in the first and second IVRS embodiments shown in FIGS. 3 and 4, respectively.

Figure 5:
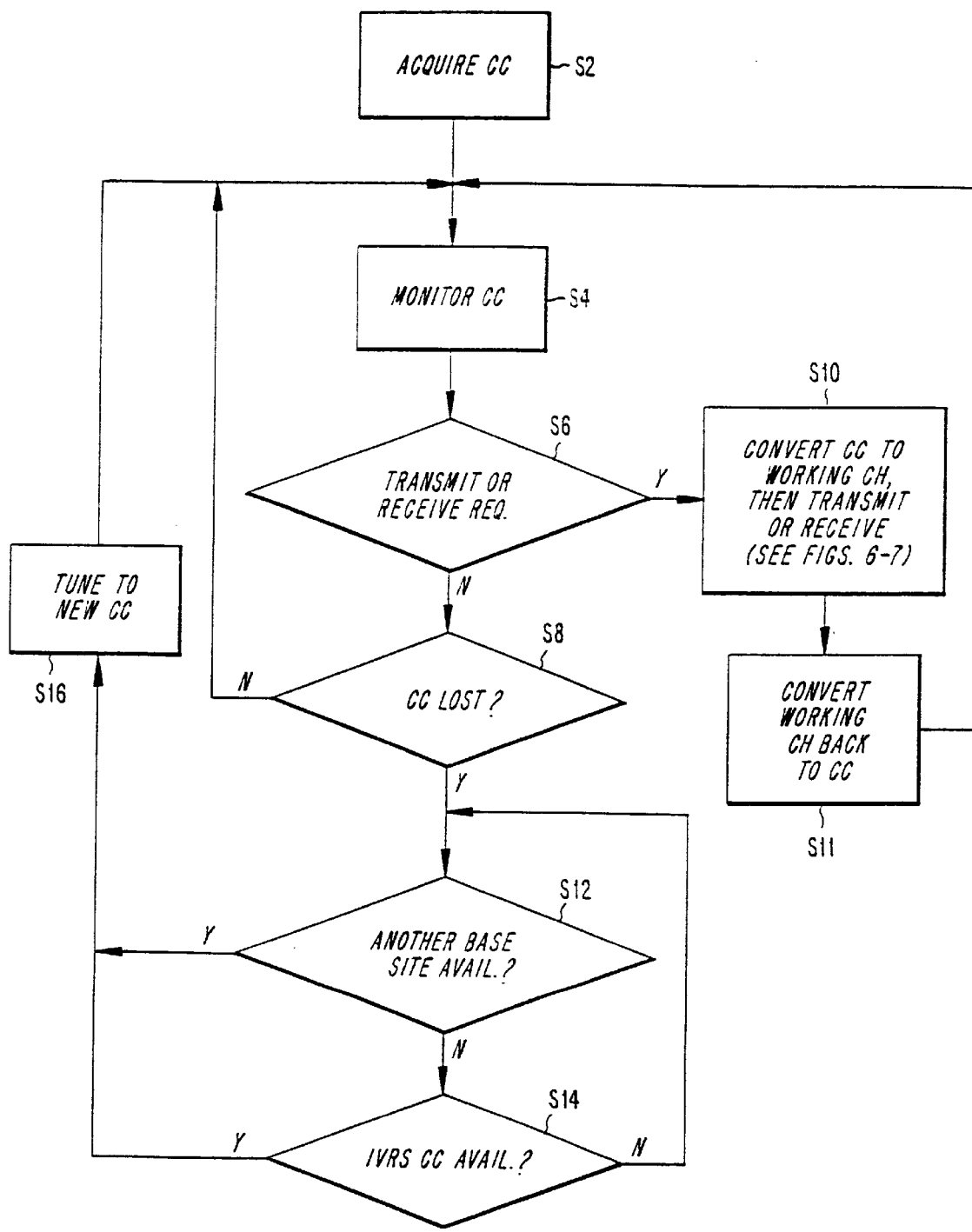
FIG. 5 shows an exemplary protocol according to the present invention for selecting a control channel.

Beginning with FIG. 5, each portable mobile radio (e.g. radio 14) may include a memory section including a personality profile of the device. The personality profile is preferably programmable by the user for use in association with a particular base site or sites. The personality profile contains, among other information, a list of preferred systems on which the device can access base station 16. Preferably, the list ranks the systems and their associated control channels according to their suitability. For example, the first entry on the list might contain the control channel identifier for the base station 16 that the portable radio is primarily intended to communicate with. If the portable radio is intended for use in a milti-base trunked system, the personality profile may contain channel identifiers associated with other base sites. Of still lower preference, the list may contain channel identifiers associated with one or more vehicular repeaters (IVRS).

Thus, when the portable is first turned on it begins by acquiring a control channel (step S2) using the personality profile stored in the memory of the portable radio (e.g. 14). The portable radio then monitors the acquired control channel for requests to transmit or receive messages (step S4). In the absence of a request to transmit or receive a message, the portable radio 14 remains in an idle state locked onto the control channel.

If the user activates a press-to-talk (PTT) switch on the portable radio, or the base station transmits a message to the user's group of mobiles (e.g. to all narcotics officers), then the control channel is "converted" to a working channel (step S10). The message is transmitted on the working channel, as will be described later in FIGS. 6 and 7. Thereafter, the working channel is "converted" back to a control channel, as described more fully in the above referenced U.S. Pat. No. 5,408,680 to Hattey et al. (step S11)

For various reasons, the portable radio 14 may "lose" its control channel (step S8). For instance, a control channel may "deteriorate" because the user moves to a location which the control channel can not provide adequate service. The "deterioration" of the control channel may be gauged from a waning signal strength measure (e.g. RSSI) or the loss of sync on the control channel for a predetermined time period (e.g. five seconds), or the unavailability of a control channel for a prescribed amount of time due to an unusually long call by another portable radio. Alternatively, the control channel may have sufficient strength, yet the portable radio detects that another control channel would provide a superior control channel. A superior control channel might correspond to a stronger signal or a control channel having a higher ranking in the personality profile of the portable unit. If so, the communication system might allow the portable station to switch to that preferred channel.

By way of example, the officer 12 may begin his investigation in an open field in which his portable radio 14 has sufficient power to reach the base station. Accordingly, the base station will be locked directly onto the control channel of the base site 16. Thereafter, the officer 12 may enter a building to question various individuals, where his portable radio 14 is not successful in transmitting messages to the base site. This will prompt the portable radio to locate another control channel, which may correspond to a nearby vehicular repeater IVRS. However, when the officer leaves the building, the portable radio may once again communicate directly with the base site. The portable would accordingly switch back to the control channel corresponding to the base site.

If the control channel is "lost", the portable radio will commence scanning for another control channel. Preferably, the portable radio 14 will look for available base sites first (step S12) followed by an available IVRS in the area (step S14). If these sites are available, the portable may tune its control channel to these new sites (step S16) and resume monitoring the new control channel for message activity (step S4).

The IVRS unit itself performs a similar control scanning procedure. Namely, each IVRS unit includes its own personality profile storing a list of pre-programmed frequencies on which it may communicate with portable radios. Upon activation of the IVRS by automatic or manual means, the receiver section 48 of the IVRS will monitor each channel contained in its personality profile until it locates one which is not currently in use by another IVRS. If no channel is available, the IVRS will not become active and portables will be forced to communicate with one or more preexisting IVRS units on the scene. The inactive IVRS will, however, continue to search and monitor channels in the event that one should become available.

Preferably, the radio communication system will attempt to accommodate as many different IVRS units in a given geographic area as possible. This distributes the call traffic to many different IVRS units, and prevents any one IVRS unit from becoming overworked (and consequently depleting its battery supply).

Figure 6:
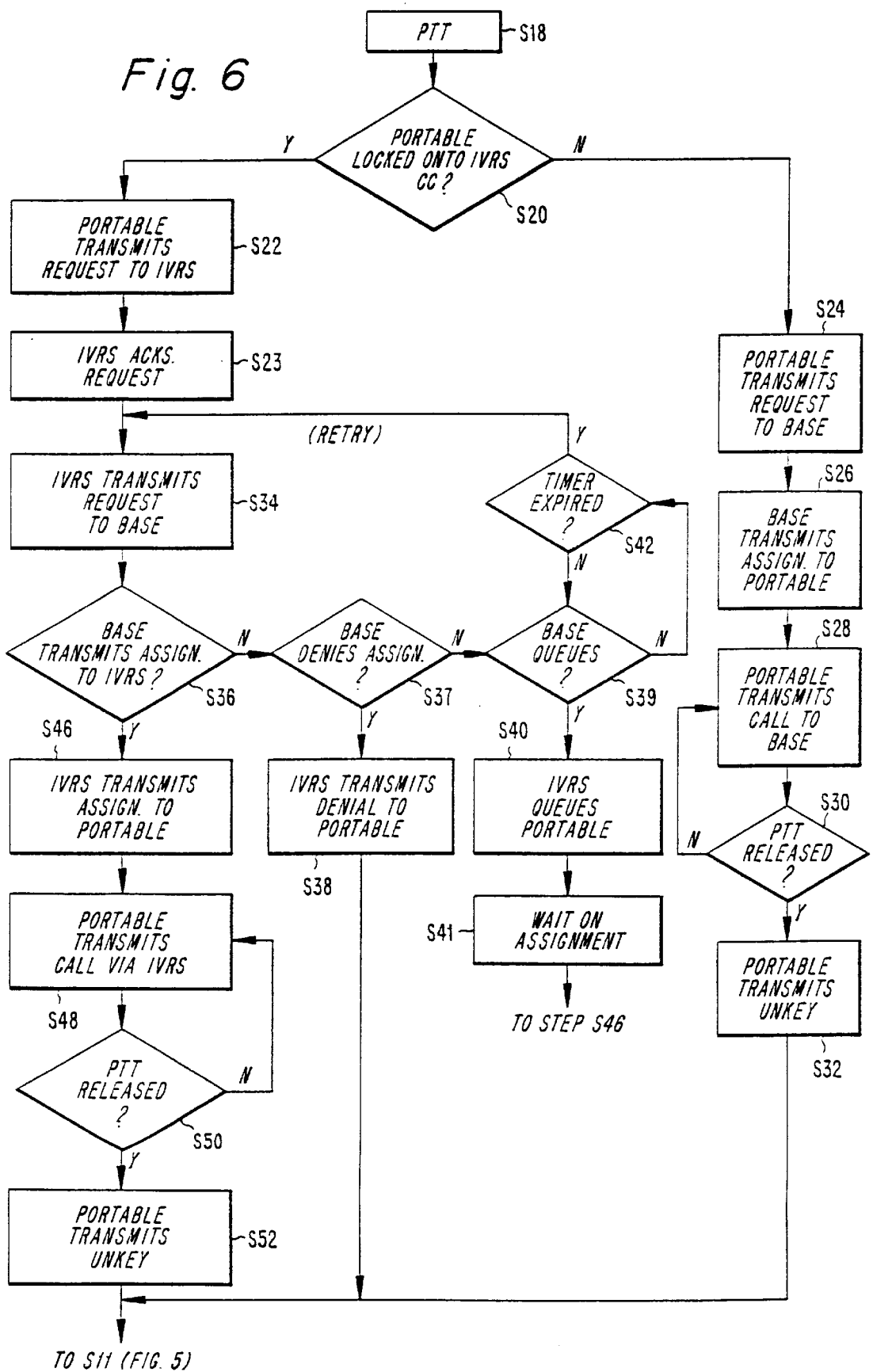
FIG. 6 shows an exemplary protocol according to the present invention for transmitting a message.
Figure 7:
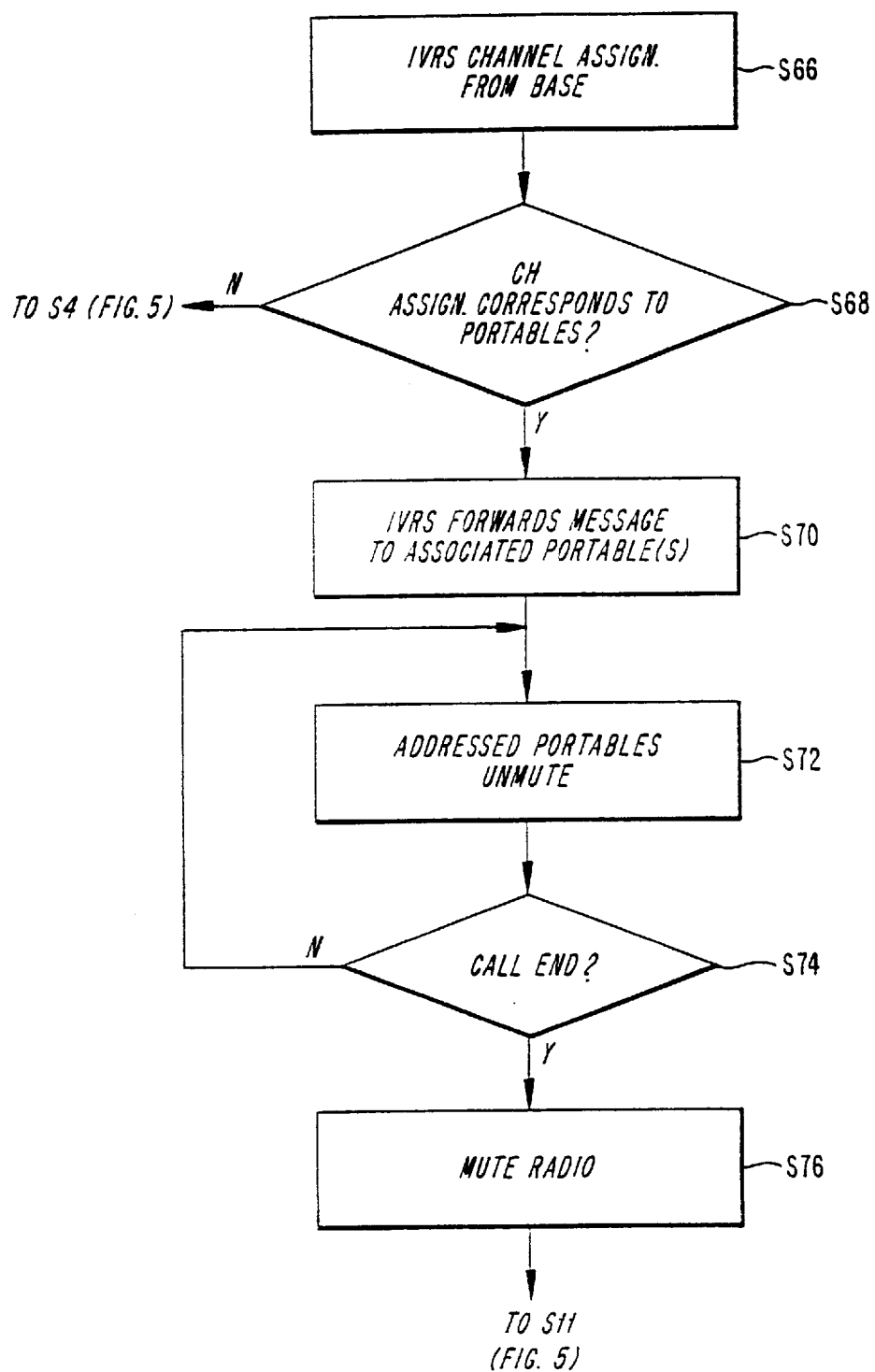
FIG. 7 shows an exemplary protocol according to the present invention for receiving a message.

FIG. 6 describes an exemplary protocol by which the portable radios of the present invention may transmit messages to a base site, while FIG. 7 describes an exemplary protocol by which the portable radios may receive messages from the base site. By way of general overview, a channel in the SCAT protocol remains a control channel if no user is presently communicating messages on the channel. A user initiates a communique by depressing a press-to-talk button on his portable radio. In response thereto, the portable radio transmits a request message to the acting base site. The acting base site will respond by transmitting three channel assignment messages to the portable radio. The base site transmits three messages as a safeguard to ensure reception of this information by the portable radio. At this point, the control channel is now an assigned channel. The acting base site will then transmit a synchronization word followed by a confirmation message. Upon receiving the confirmation message, the portable radio transmits its audio message (or in general, its data) to the acting base site, coupled with a dotting code preface.

With reference to FIG. 6, an exemplary protocol for communicating between a portable unit and a base site will now be described in more detail. In step S18 the user of the portable radio initiates a message transfer by pressing the push-to-talk button of his radio. If the portable radio is currently locked directly onto the base site (as ascertained in step S20), the portable radio will transmit a request for transmission directly to the base site (step S24). The base site will return a channel assignment, thereby converting the control channel into an assigned "working" channel (step S26). The user of the portable radio then proceeds to transmit his audio message (step S28). If the user releases the PTT button (step S30) then the call terminates by transmitting an unkey message (step S32). In a similar manner, the portable radio may receive communication directly from the base site, if within the transmitting range of the base site.

On the other hand, if the portable radio is currently locked onto the IVRS station at the time the PTT button is depressed, the portable unit will start by transmitting a request for transmission to the IVRS unit (step S22). Upon receiving this request, the IVRS transmits an IVRS acknowledgement message to the portable radio (step S23). The IVRS then transmits a request for transmission to the base site 16 (step S34).

At this juncture, the base site may deny assignment (as ascertained in step S37), upon which the IVRS transmits a message to the portable unit notifying the portable unit that the IVRS has been denied an assignment. Alternatively, the base site may queue the IVRS's request (as determined in step S39), upon which the IVRS queues the calling portable (in step S40). The portable then waits until the IVRS receives an assignment from the base site (step S41). If the IVRS is not informed that its request has been queued (as determined in step S39), it will wait a prescribed amount of time (step S42), after which it will retransmit its request to the base site (in step S34).

Providing that the IVRS does establish a working channel with the base site 16 the protocol proceeds to step S46 where the IVRS transmits a working channel assignment message to the portable radio. Upon receiving this message, the user proceeds to transmit his audio message via the IVRS unit to the base site (step S48). The communique is terminated when the user deactivates the PTT switch (step S50), upon which the portable radio transmits an unkey message over the channel (step S52).

FIG. 7 shows an exemplary protocol for receiving messages using the radio communication system according to the present invention. By way of introduction, upon logging into an IVRS, a portable unit provides its logical ID (LID) and talk group ID which it is monitoring (GID). The IVRS stores this ID information to form a list of all portable LIDs and GIDs associated with the IVRS unit. Upon receiving a call from the base site, the IVRS consults this list to determine whether the call is addressed to any associated portable(s) (steps S66 and S68). If so, the IVRS unit instructs the addressed portable radios to unmute their audio (step S70 and S72) to receive the call. At the termination of the call, the portable units are instructed to again mute their radios (steps S74 and S76), upon which the portables and IVRS monitor their respective control channels for further calls (step S4 of FIG. 5).

In one exemplary embodiment, the portable units transmit a login message whenever switching to an IVRS site. In other embodiments, the portable units may additionally transmit a login message whenever the portable units change to a new talk group.

It is desirable to update the IVRS list of LIDs and GIDs whenever portable units leave the coverage provided by an IVRS, or otherwise become disassociated with the IVRS. In this manner, the IVRS can cease monitoring calls destined for LIDs and GIDs no longer associated with the IVRS unit. To this end, in one embodiment, the portable radio may transmit a logout message when leaving an IVRS. In a second embodiment, the IVRS automatically removes inactive LIDs and GIDs from its list after a prescribed time-out period. In a third embodiment, the IVRS unit requests inactive portables to re-login after a prescribed period. The third embodiment allows infrequently used portables to maintain their LIDs and GIDs on the IVRS list; only those portables which do not re-login will be dropped.

From the above discussion, it is seen how the portable units communicate with the IVRS repeater in much the same manner as they communicate with the SCAT base station. In this sense, the IVRS units may be conceptualized as a portable base station.

This analogy may be extended by actually eliminating the radio #1 illustrated in FIGS. 3 and 4, and using the vehicular repeater as a stand-alone portable base site. Such a base station could be readily transported to remote areas which are out of range of fixed base stations. This may be used to provide radio communication services to support disaster relief activities in remote areas. Alternatively, the portable base station could be transported to an area to supplement a pre-existing radio communication system, and thereby alleviate the processing load of the pre-existing radio communication system. Further details regarding the use of IVRS technology as a stand-alone portable base station may be found in commonly assigned U.S. application Ser. No. (our reference no. 027575-005), entitled "Deployable Single Channel Autonomous Trunked Communications System", Ser. No. 08/705,553.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A wireless communication system for a trunked system, comprising:

a base site station;

one or more vehicular repeaters; and one or more mobile radios for direct communication with said base site station in a communication band, or for indirect communication with said base site station via said one or more vehicular repeaters in said same communication band;

wherein said one or more vehicular repeaters communicate with said one or more mobile radios using at least one radio communication channel which operates alternatively in a control channel mode and in an assigned channel mode, with an idle mode being the control channel mode.

2. A wireless communication system for a trunked system, comprising:

a base site station;

one or more vehicular repeaters; and one or more mobile radios for direct communication with said base site station in a communication band, or for indirect communication with said base site station via said one or more vehicular repeaters in said same communication band, wherein at least one of said one or more vehicular repeaters comprises:

a first operational radio for communicating with said base site station;

an in-band vehicular repeater module, connected to said first operational radio, for communicating with at least one of said one or more mobile radios.

3. The wireless communication system of claim 2, wherein said repeater module comprises:
- a transmitter section for forwarding a message received from said base site station to said at least one of said one or more mobile radios; and
- a first receiver section for forwarding a message received from said at least one of said one or more mobile radios to said base site station.

4. The wireless communication system of claim 3, wherein said repeater module comprises:
- a second receiver section with padded input for receiving input from only nearby radio communication sources.

5. The wireless communication system of claim 4, wherein said first transmitter section and said second receiver section are provided by a second radio, and wherein said first receiver section is provided by a third radio.

6. The wireless communication system of claim 4, wherein said first transmitter section and said first and second receiver sections are provided by one duplexed radio system.

7. A vehicular repeater system for providing communication with a base site station in the same wireless communication band in which it communicates with one or more mobile radios, comprising:
- a first operational radio for communicating with said base site station;
- an in-band vehicular repeater module, connected to said first operational radio, for communicating with at least one of said one or more mobile radios.

8. The repeater of claim 7, wherein said vehicular repeater communicates with said one or more mobile radios using at least one radio communication channel which operates alternatively in a control channel mode and in an assigned channel mode, with an idle mode being the control channel mode.

9. The repeater of claim 7, wherein said repeater module comprises:
- a transmitter section for forwarding a message received from said base site station to said at least one of said one or more mobile radios; and
- a first receiver section for forwarding a message received from said at least one of said one or more mobile radios to said base site station.

10. The repeater of claim 9, wherein said repeater module comprises:
- a second receiver section with padded input for receiving input from only proximate radio communication sources.

11. The repeater of claim 10, wherein said first transmitter section and said second receiver section are provided by a second radio, and wherein said first receiver section is provided by a third radio.

12. The repeater of claim 10, wherein said first transmitter section and said first and second receiver sections are provided by one duplexed radio system.

13. The repeater of claim 10, further including a memory storing a list identifying the mobile radios associated with said repeater, and the groups to which each of said associated mobile radios belong.

14. A method for communicating radio messages in a system comprising at least a portable radio unit, a repeater unit, and a base station, comprising the steps of:
- communicating messages directly between said portable unit and said base station if said base station is available, wherein said communication with said base base station employs a prescribed communication frequency band; and
- communicating messages between said portable unit and said repeater unit if said base station in not available, wherein said communication with said repeater unit employs said same prescribed communication frequency band employed by said portable unit in communicating directly with said base station.

15. A method for communicating radio messages according to claim 14, further wherein said communication with said base station and said communication with said repeater unit employ compatible digital message protocol.

16. The method of claim 14, wherein said step of communicating messages between said portable unit and said repeater unit comprises first establishing a repeater communication channel such that said channel does not interfere with other nearby repeater communication channels currently in use by other repeaters.

17. A method for communicating radio messages in a system comprising at least a portable radio unit, a repeater unit, and a base site, comprising the steps of:
- inquiring, by said portable unit, the availability of a control channel associated with said base site;
- if said control channel associated with said base site is available then:
  - locking onto, by said portable unit, said control channel associated with said base site; and
  - transmitting or receiving a message on said control channel associated with said base site by converting said control channel associated with said base site to a working channel;
- and if said control channel associated with said base site is not available then:
  - inquiring, by said portable unit, the availability of a control channel associated with said repeater unit;
  - locking onto, by said portable unit, said control channel associated with said repeater unit if said repeater control channel is available; and
  - transmitting or receiving a message on said control channel associated with said repeater unit by converting said control channel associated with said repeater unit to a working channel.

18. A method for communicating radio messages in a system comprising at least a portable radio unit, a repeater unit, and a base site, comprising the steps of:
- transmitting, by said portable radio unit, a message to said repeater unit, said message informing said repeater unit of the identity of said portable radio unit, and the identity of a group of portable radio units to which said portable unit belongs;
- storing indicia at said repeater unit representative of said identity of said portable radio unit and the identity of said group;
- monitoring, by said repeater unit, a control channel for messages addressed to said portable unit by making reference to said indicia; and
- upon determining that a message is addressed to said portable unit, allowing said portable unit to receive said message.

19. The method of claim 18, further comprising the step of:
- deleting said indicia representative of said identity of said portable radio unit and the identity of said portable radio's group when said portable unit disassociates itself with said repeater unit.

20. The method of claim 18, further comprising the step of:

deleting said indicia representative of said identity of said portable radio unit and the identity of said portable radio's group after a prescribed amount of time.

21. The method of claim 18, further comprising the step of:

requesting said portable radio to repeat said transmitting step after a prescribed amount of time.

22. A vehicular repeater for providing communication with a base site station in the same wireless communication band in which it communicates with one or more mobile radios, comprising:

a first operational radio for communicating with said base site station;

an in-band vehicular repeater module, connected to said first operational radio, for communicating with at least one of said one or more mobile radios;

a receiver with attenuated input for receiving input from proximate radio communication sources to determine the presence of other nearby vehicular repeaters.

* * * * *